Aug. 6, 1968     J. H. CAMPBELL     3,396,307
TRANSISTOR INVERTER LAMP BALLASTING CIRCUIT
Filed April 17, 1967
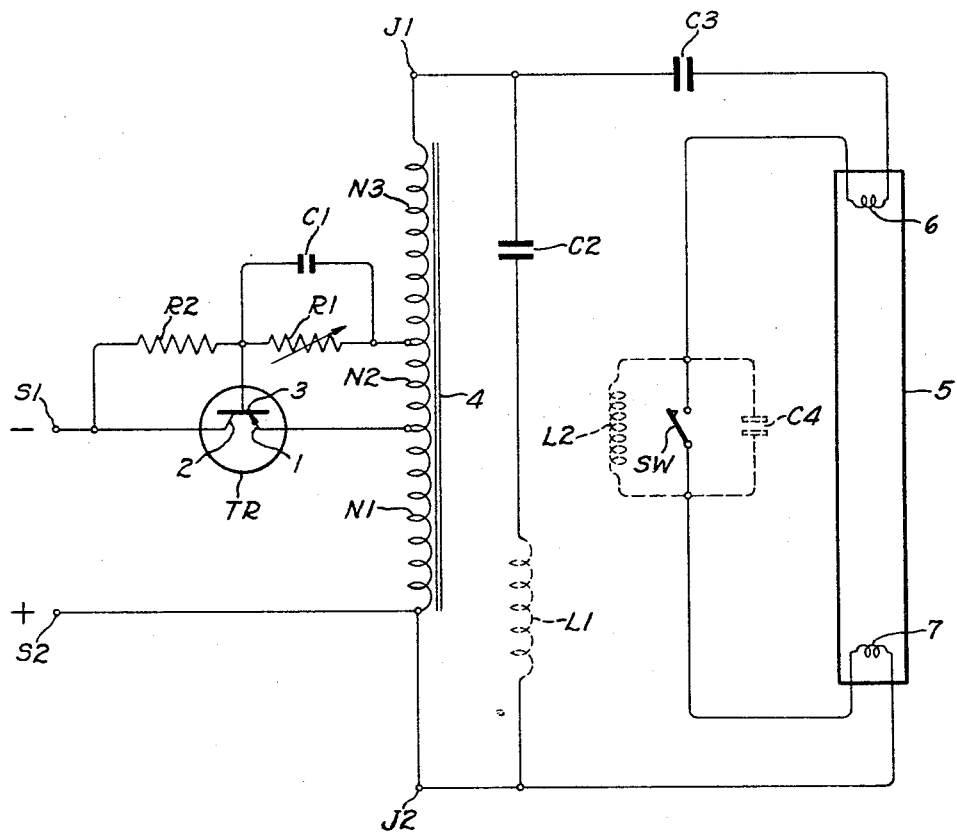
Inventor:
John H. Campbell
by Ernest W. Legree
His Attorney 3,396,307
TRANSISTOR INVERTER LAMP
BALLASTING CIRCUIT
John H. Campbell, Mentor, Ohio, assignor to General
Electric Company, a corporation of New York
Continuation-in-part of application Ser. No. 411,484,
Nov. 16, 1964. This application Apr. 17, 1967, Ser.
No. 642,617
2 Claims. (Cl. 315—221)

ABSTRACT OF THE DISCLOSURE

A single transistor inverter circuit for operating fluorescent lamps from a direct current source. The transistor is connected, in series with the primary winding of an autotransformer, across the D.C. supply with a feedback connection from transformer secondary to base electrode. The load circuit comprises the lamp connected in series with a capacitor across the transformer secondary. A shunt capacitor is connected across the transformer secondary for load regulation under open circuit conditions when excessively high voltages might damage the transistor.

---

This invention relates to a transistor inverter circuit using a single semiconductor control device or transistor for obtaining from a direct current supply an alternating current output suitable for operating and ballasting an electric discharge lamp.

This application is a continuation-in-part of my copending application Ser. No. 411,484, filed Nov. 16, 1964, similarly titled and assigned and now abandoned.

Transistor inverters provide a convenient means for obtaining alternating current from a direct current supply and are finding increasing use on account of their high efficiency. Most of the circuits of this kind which have been devised to date having characteristics and overall efficiency suitable for operating electric discharge lamps utilize two or more transistors. However transistors are relatively expensive circuit elements.

The object of the invention is to provide an improved single transistor inverter circuit which is low in cost and which has characteristics suitable for operating and ballasting an electric discharge lamp such as a fluorescent lamp.

In the single transistor inverter circuit, the transistor is connected through its emitter-collector path in series with a winding of a step-up transformer across a direct voltage supply. Another winding in the transformer provides feedback to the base electrode of the transistor whereby to hold the transistor turned on until the core of the transformer saturates. The discharge lamp is connected across the secondary or output winding of the transformer in series with a capacitor and energy is transferred to it in one polarity until such time as the core saturates. Upon the occurrence of saturation, current flow is cut off and energy is now transferred to the lamp with reverse polarity resulting from the collapse of flux in the core. Such a circuit is described and claimed in copending application of Harry E. Schultz, Ser. No. 114,200, filed June 1, 1961, entitled Transistor Inverter Ballasting Circuit, and assigned to the same assignee as the present invention, now Patent 3,247,422.

In accordance with my invention, in order to stabilize operation and prevent excessive voltages from being developed in the transformer prior to starting of the lamp, a shunt capacitor is connected across the secondary or output winding of the transformer. The shunt capacitor operates as a load on the oscillator prior to starting of the lamp and prevents excessively high voltages from occurring which could destroy the transistor. According to another feature of my invention, the feedback connection to the base of the transistor is made through a resistor, preferably temperature variable, shunted by a capacitor which provides a steeper wavefront and assures faster switching and less dissipation.

Other advantages and features of the invention will become apparent from the following description as developed in connection with the embodiment illustrated in the drawing. The features of the invention believed to be novel will be more particularly pointed out in the appended claims.

The single figure of the drawing is a schematic circuit diagram of a transistor inverter circuit embodying the invention for operating an electric discharge lamp.

Referring to the drawing, the direct current source or supply which suitably may be a 12-volt battery, is connected across input terminals S1, S2 with the polarity indicated. Of course other sources of direct current may likewise be used, such as for instance a rectifier operating from the usual 115–120 volt, 60 cycle alternating current supply. Transistor TR used in this circuit is of the p-n-p junction type and the symbolic representation indicates the emitter electrode 1 by the angled line with arrowhead, the collector electrode 2 by the plain angled line, and the base electrode 3 by the base line. The transistor is turned on by forward biasing the base, that is by biasing the base electrode in the direction of the collector electrode. With the connections and polarities indicated, the transistor is turned on by making base electrode 3 negative with respect to emitter electrode 1.

Transistor TR is connected through its emitter-collector electrode path, in series with winding N1 of transformer 4 across the direct voltage input terminals S1, S2. Transformer 4 is provided with windings N2 and N3 connected in series relationship with winding N1 so that all three windings constitute an auto-transformer output or secondary winding across which voltage is induced by transformer action. The voltage induced in winding N2 is applied to the base of the transistor through a resistor R1 shunted by capacitor C1. With some transistors it is desirable to connect the base to the collector by a resistor R2. A shunt capacitor C2 is connected across the transformer output at terminals J1, J2. The load circuit connected across the transformer output comprises in series current limiting capacitor C3 and discharge lamp 5. The discharge lamp may conveniently be a fluorescent lamp of the type having filamentary electrodes at both ends. The electrodes 6, 7 are heated at starting by closing switch SW to short circuit the filamentary electrodes across the output circuit.

The principle of operation is as follows. When voltage is first applied by connecting terminals S1, S2 to a suitable source (or, if already connected, by closing a control switch), some current will flow through transistor TR and winding N1. With the source polarities indicated, voltage will be induced in the transformer windings with a polarity which will be negative at terminal J1 and positive at terminal J2. The voltage generated in winding N2 and which is applied to the base 3 of the transistor through the combination of resistor R1 and capacitor C1 tends to make the base negative relative to the emitter 1. In other words, the effect of incipient current flow in winding N1 is to bias the base of the transistor in the direction of the potential on the collector and the final result, by cumulative action, is to turn the transistor fully on. The rising current in primary winding N1 induces voltages in windings N2 and N3 which add in series through the autotransformer connection and this total voltage is applied to the lamp 5 through the ballasting capacitor C3. During the time interval that the transistor is turned on, energy is being fed into and stored in the transformer inductance according to the relationship $\frac{1}{2}LI^2$, where L is the inductance of winding N1, and I is the current in winding N1 minus the transformed load current and the relatively small transformed base current. Prior to starting of the lamp, the load current component is relatively minor; however after the lamp has ionized, the load current component is considerable since it reflects the energy being translated into the lamp circuit.

After a period of time during which the transistor has been conducting, the core of transformer 4 saturates and the voltage induced in the windings then falls off to zero. The voltage applied to the base and which has been biasing it in the direction of the collector, now begins to fall off and conduction through the transistor in the emitter-collector path likewise begins to fall off. This process is in a direction to collapse the flux in the transformer core and to induce a voltage of reverse polarity in the windings whereby terminal J1 becomes positive and terminal J2 negative. This process is cumulative and culminates in completely cutting off current flow through the transistor.

The rate of collapse of flux in the transformer core, and the voltage induced thereby in the transformer windings, is determined by several factors operating concurrently. One factor is the transformer, particularly the core characteristics, eddy current losses, and hysteresis losses. Another factor is the current through and voltage across the load circuit which will be different when the lamp is ionized and conducting than when the lamp is non-conducting.

It is desirable to use a powdered-iron or ferrite or molybdenum permalloy material having low loss and rectangular hysteresis loop characteristics in a closed or toroidal configuration, for the transformer core in order to reduce eddy current and hysteresis losses to a minimum. With such a core material, the rate of flux collapse in the transformer is not effectively limited by the core material. Where there is a lamp in an ionized conducting state in the load circuit, the energy transferred to the load circuit limits the rate of flux collapse and there is no problem. However if there is no effective lamp load, the load circuit cannot effectively limit the rate of flux collapse and the resulting high voltages induced in the transformer windings may damage the circuit elements and in particular may destroy the transistor.

The invention solves the foregoing problem in simple and inexpensive fashion by the provision of shunt capacitor C2 across the transformer output circuit. Capacitor C2 functions as a load regulator by presenting a leading power factor load circuit to prevent the voltage and frequency from rising to considerable levels while open circuit conditions exist at the lamp. Such conditions would occur upon failure to close switch SW, or if a defective lamp should be placed in the circuit, or if there should develop an open connection to a lamp terminal. Capacitor C2 provides a load for the transformer, and in so doing, regulates the point in time at which the core saturates and thereby limits the rate of collapse of flux in the core. A choke or inductance L1 (shown dotted) may optionally be connected in series with capacitor C2 in order to increase the load power factor and provide the lamp with a more nearly sinusoidal waveform. By so doing, lamp current required for a given loading is reduced and lamp efficiency is increased.

Resistance R1 has been symbolically indicated in the drawing as a variable resistance. The preferred form for this resistance is a miniature filament lamp whose tungsten filament has a positive temperature coefficient of resistance. This will achieve the result that the resistance of R1 initially is low when the current drawn by the base is low, but its resistance will increase due to the rise in temperature resulting from current flow. Therefore such choice of temperature variable resistance for R1 serves to insure the initial turn-on of the transistor by presenting a low resistance. During operation, the current flowing through R1 causes it to rise in temperature and the resulting increase in resistance reduces the base current flow and produces a significant increase in efficiency. It also assures starting of transistors of low leakage current which might not start reliably with the optimum fixed resistance commonly used in power transistor circuit. Resistor R2 is desirable to assure starting with transistors of very low leakage current. In selecting an incandescent lamp to serve for R1, one is chosen having a filament resistance such that it will operate considerably under its rating whereby to assure a life commensurate with that of the equipment. The incandescent lamp may then be wired in as a permanent component.

The function of capacitor C1 is to provide a steep wave front for the switching function and prevent excessive dissipation within the transistor, as might result if resistance alone were used, that is if R1 were used without C1 shunting it.

In the illustrated circuit, the lamps are started by short-circuiting the filamentary cathodes together through switch SW in what may be described as a switch-start circuit. One may also use a rapid-start circuit wherein the electrodes are heated at starting and during operation by providing additional low voltage windings on transformer 4 which are connected across the electrodes, as shown for instance in the aforementioned Schultz application. An alternative arrangement consists in replacing switch SW by an impedance which may be either the capacitor C4 of the inductance L2 shown in dotted lines. While capacitor C4 could be chosen to have a value such that it will replace regulating capacitor C2 in the circuit, this is not desirable because removal of the lamp would eliminate the regulating feature. Instead of capacitor C4, an inductance L2 may be used as the series element in a case where it may be desirable to design a transformer for a lower circuit voltage. In such design, L2 would perform two functions, firstly providing circuit continuity for cathode heating current, and secondly achieving partial resonance in the load circuit whereby to increase the voltage for starting the lamp.

After the flux in the transformer core has collapsed, conduction again begins through the transistor, and the induced voltages turn the transistor fully on so that the cycle repeats. In general, the transistor passes sufficient energy during the conduction phase of the cycle to operate the lamp during that phase and also during the succeeding phase when the transistor is not conducting. Therefore during the conduction or flux build-up phase, half the energy passed by the transistor is supplied to the lamp and the other half is stored in the transformer core. During the non-conduction or flux collapse phase, the energy stored in the transformer core is transferred to the lamp.

In a circuit actually constructed in accordance with the figure of the drawing and tested in operation of a single 6WT-5 fluorescent lamp for a total load of 6 watts at 17,000 cycles from a 12-volt battery supply, the following circuit constants were used and they are listed herein by way of example and not in order to limit the invention thereto:

Transistor TR _____ Type 2N1073 (Bendix) or 553 (Delco).
Transformer:
    Winding N1 ____ 8 turns No. 26 wire.
    Winding N2 ____ 3 turns No. 26 wire.
    Winding N3 ____ 180 turns No. 30 wire.
    Core _____ Ferrite bobbin and sleeve; O.D., ¾"; I.D., ⅜"; height ½".
Resistor R1 _____ #47 miniature incandescent lamp (10 ohms cold, 40 ohms hot).
Resistor R2 _____ 470 ohms.
Capacitor C1 _____ 1.0 microfarad.
Capacitor C2 _____ .01 microfarad.
Capacitor C3 _____ .01 microfarad.

The same circuit with the same constants may be used to operate a pair of 6WT-5 lamps in series for a total load of 12 watts.

A like circuit with heavier components has been used to operate a fluorescent panel lamp FP12S at 48 watts input into the lamp, lamp voltage 150 volts, lamp current 0.320 ampere, frequency 13.3 kilocycles. Under these conditions, the secondary or output voltage across the transformer was 310 volts, and the collector-to-emitter voltage was 210 volts (approx. 300 volts peak). Upon removing the lamp from the circuit, frequency became 33 kilocycles, secondary voltage became 270 volts, and collector-to-emitter voltage became 160 volts (approx. 225 volts peak), perfectly safe conditions. In a comparative test with shunt capacitor C2 disconnected and with the lamp removed from the circuit, frequency rose to 42.0 kilocycles, and secondary or output voltage across the transformer rose to 400 volts when the input or line voltage into the unit was only 35% of normal. The collector-to-emitter voltage then was 320 volts (approx. 460 volts peak) and any higher voltage would have destroyed the transistor. The test thus shows that shunting capacitor C2 in accordance with the invention is essential to prevent excessice voltage and frequency rise and to avoid burning out of the transistor in the event of failure of the load circuit, for instance as a result of a missing, defective, or improperly connected lamp.

In certain applications, for instance in automobiles, the battery negative terminal is grounded and the negative circuit connection is automatically made when the unit is fastened to the chassis. In such case, a saving in wiring may be achieved by returning electrode 7 directly to ground instead of to point J2 or the positive side of the battery. This reduces the voltage applied across the lamp by the amount of the battery voltage but this loss can readily be made up in the design of the transformer.

The specific circuit which has been described herein is intended as exemplary and not as limitative of the invention. Whereas the invention has been described using a p-n-p type transistor, an n-p-n type transistor may fully well be used with appropriate modification of the source polarity with respect to the circuit. Other modifications will occur to those skilled in the art. The appended claims are intended to cover any such modifications coming within the true spirit and scope of the invention.

What I claim as new and desire to secure by Letters Patent of the United States is:

1. An inverter circuit comprising a direct current source, a transistor having base, emitter and collector electrodes, a transformer having input and output windings and a saturable core of rectangular hysteresis loop characteristic and low losses insufficient to limit effectively the rate of flux collapse therein, an input circuit comprising the emitter-collector electrode path of said transistor and said input winding connected in series across said source, a load circuit comprising said output winding, a series capacitor, and an electric discharge lamp all connected in series, a feedback connection comprising a resistor and a capacitor connected in parallel between a point on said output winding and the base of said transistor for turning said transistor on during the phase of flux build-up in said core and off upon saturation of said core and during the phase of flux collapse subsequent thereto, said resistor being filamentary in order to vary in temperature with current and having a positive temperature coefficient of resistance, current flow through said transistor during the phase of flux build-up serving to transfer energy to said lamp and to store energy in said transformer which is transferred to said lamp during the phase of flux collapse, and a shunt capacitor connected across said output winding to prevent excessive rise in voltage and frequency in the event of failure of said load circuit.

2. A circuit as defined in claim 1 wherein the resistor in said feedback connection is a miniature tungsten filament incandescent lamp.

References Cited

UNITED STATES PATENTS 2,971,126  2/1961  Schultz _____ 315—100

FOREIGN PATENTS 854,206  11/1960  Great Britain.

JOHN W. HUCKERT, *Primary Examiner.*

J. D. CRAIG, *Assistant Examiner.*